2,831,024

PROCESS FOR PRODUCING DIBASIC CARBOXYLIC ACIDS

George P. Brown, Jr., West Deer Township, Allegheny County, Edgar I. Crowley, Pittsburgh, and Norman W. Franke, Penn Township, Allegheny County, Pa., assignors to Gulf Research & Development Company, Pittsburgh, Pa., a corporation of Delaware No Drawing. Application April 4, 1955
Serial No. 499,228

10 Claims. (Cl. 260—531)

This invention relates to a process for preparing dibasic carboxylic acids and particularly to a process for preparing dibasic carboxylic acids from organic compounds by oxidation with nitric acid.

The production of dibasic carboxylic acids by oxidation of cycloparaffins with nitric acid is of great commercial interest. While the cycloparaffin can be oxidized directly with nitric acid to produce dibasic carboxylic acids, it is advisable to preoxidize the cycloparaffin in air or other gas containing molecular oxygen prior to oxidizing with nitric acid in order to cut down on the amount of nitric acid needed. The air oxidation product obtained includes unconverted cycloparaffin, large amounts of cycloalkanols and cycloalkanones, and lesser amounts of cycloalkyl ethers, cycloalkyl esters and cycloalkanediols. In some cases all of the air oxidation product obtained can thereafter be subjected to further oxidation with nitric acid to produce dibasic carboxylic acids. In other instances, the unconverted cycloparaffin can first be stripped from the air oxidation product, such as by steam distillation, and the remainder treated with nitric acid. In still other cases, after removal of the unconverted cycloparaffin the cycloalkanols and cycloalkanones can then be recovered as a mixture by further distillation with steam and by the usual vacuum fractionating techniques, and the mixture of cycloalkanols and cycloalkanones can then be further oxidized with nitric acid to obtain dibasic carboxylic acids.

The important compounds present in the air oxidation products obtained above, insofar as the final dibasic carboxylic acids are concerned, are the cycloalkanols and cycloalkanones, since they are the compounds which upon further oxidation are most readily converted to dibasic carboxylic acids. While the yield of dibasic carboxylic acids obtained and the amount of nitric acid used will vary somewhat with the portion of the air oxidation product subjected to further reaction with nitric acid, the final oxidation product produced in any case will be substantially the same in composition. Although the two-stage process for producing dibasic carboxylic acids from cycloparaffins, employing air or other gas containing molecular oxygen in the first stage and nitric acid in the second stage, results in a reduction in the amount of nitric acid employed over a single stage process employing nitric acid, the amount of nitric acid required to obtain dibasic carboxylic acids in good yields for commercial production is still great enough to pose a serious economic problem.

We have found that the process for obtaining dibasic carboxylic acids from a mixture comprising cycloalkanols and cycloalkanones by oxidation with nitric acid can be improved and the amount of nitric acid used can be appreciably reduced by maintaining a partial pressure of molecular oxygen upon the reactants during the oxidation with nitric acid.

Referring to the air oxidation of cycloparaffins discussed above, the charge stock subjected to air oxidation consists essentially of cycloparaffins, substituted as well as unsubstituted, capable upon air oxidation of producing cycloalkanols and cycloalkanones. The cycloparaffins preferred are those having from about 4 to about 9 carbon atoms in their molecules. Among the cycloparaffins which can be employed are cyclopentane, cyclohexane, cycloheptane, and alkyl derivatives thereof, such as methyl cyclopentane and dimethyl cyclohexane. Particularly desirable as charge stock for oxidation with air or other gas containing molecular oxygen are cyclopentane and cyclohexane.

Any convenient and effective method of oxidizing the cycloparaffin with air or other gas containing molecular oxygen can be employed provided the air oxidation product obtained contains appreciable amounts of cycloalkanols and cycloalkanones. This oxidation can be effected, for example, by air oxidizing the cycloparaffin charge stock until about 5 to about 50 percent by weight, preferably about 5 to about 20 percent by weight, of the charge stock has been oxidized. The temperature employed in the air oxidation step is not critical and can range from about 50° to about 250° C., although a temperature of about 100° to about 175° C. is preferred. The pressure can be from about atmospheric to about 1000 pounds per square inch gauge, with a pressure of about 50 to about 200 pounds per square inch being preferred. In order to catalyze and initiate the air oxidation reaction, compounds of heavy metals of variable valence such as cobalt and manganese, as well as free radical initiators, such as peroxides or aldehydes, can be employed. Included among the catalysts which can be employed are cobalt naphthenate, manganese octanoate, vanadium pentoxide and cobalt oleate.

As previously noted, the air oxidation product obtained above contains many substances, including unconverted cycloparaffins, but desirably cycloalkanols and cycloalkanones. The latter compounds generally comprise about 60 percent by weight of the oxidized products present in the air oxidation product obtained although they may total from about 40 to about 90 percent by weight of the oxidized products. The ratio of cycloalkanols to cycloalkanones in the air oxidation product is usually about 1:1, but can vary from about 1:10 to about 10:1 depending upon the charge stock and reaction conditions employed.

As pointed out above, the most effective compounds which are passed to the nitric acid reaction stage and are converted to dibasic carboxylic acids are the cycloalkanols and cycloalkanones. Therefore, in the mixture treated with nitric acid the cycloalkanols and cycloalkanones can be present, relative to each other, in any and all proportions, and if desired only one of said compounds need be present. The remaining compounds identified as being present in the air oxidation product have little or no adverse effect upon the subsequent reaction with nitric acid converting the cycloalkanols or cycloalkanones to dibasic carboxylic acids.

Although we have dwelt at length above on the fact that the mixture comprising cycloalkanols and cycloalkanones to be treated can conveniently be obtained from air oxidation of cycloparaffins under controlled conditions, it is understood that such mixtures can also be obtained from other sources and be similarly treated with nitric acid in accordance with the process of this invention to produce dibasic carboxylic acids. Thus, cycloalkanols and cycloalkanones, singly or together in any and all proportions, regardless of the source from which they were obtained, can be employed as charge stock to the nitric acid stage.

The charge stock comprising cycloalkanols and cycloalkanones, regardless of the source from which they are obtained, are then passed to the nitric acid stage. The concentration of the nitric acid employed can be as low as about 40 percent, though a concentration of about 50 percent or above is preferred. Best results are obtained, however, with nitric acid having a concentration of about 70 percent. While the amount of nitric acid which must be present is not critical, enough should be present to assure optimum production of the dibasic carboxylic acids from the charge stock passed to the nitric acid reactor. To effect this result nitric acid in excess of that required is preferably charged to the nitric acid reactor. Thus, considering the charge as consisting of cycloalkanols and cycloalkanones in a ratio of 1:1 and the nitric acid as having a concentration of 100 percent, the weight ratio of nitric acid to charge should be at least about 1.5 to 1, preferably about 1.5 to about 5 to 1. The temperature of the nitric acid oxidation is not critical and can vary from about 30° to about 150° C., with a temperature of about 60° to about 120° C. being preferred. For a given yield, however, the reaction will take place faster at the higher temperatures. While the duration of the nitric acid reaction is somewhat dependent upon the amount and nature of the charge, the concentration of the nitric acid used, the amount of reaction desired, catalysts used etc., the amount of time required is at least about 4 minutes and can range from about 4 minutes to about 5 hours.

In accordance with the present process, the reaction of the mixture comprising cycloalkanols and cycloalkanones with nitric acid must be carried out while maintaining upon the reactants a partial pressure of molecular oxygen obtained as a result of addition thereto of air or other gas containing molecular oxygen. The total pressure upon the reactants should be at least about 50 pounds per square inch gauge and can be as high as about 2000 pounds per square inch gauge, although a total pressure of about 50 to about 500 pounds per square inch guage is preferred. The amount of molecular oxygen which is added to the reaction mixture in the nitric acid reaction zone to obtain the desired reduction in nitric acid consumption in accordance with our invention must be at least about 5 percent by weight of the charge passed to the nitric acid reaction zone, and preferably should be about 15 to about 60 percent by weight of the charge. Not only must the amount of oxygen which is passed to the nitric acid reactor be within the above limits, but the partial pressure of the oxygen upon the reactants throughout the nitric acid reaction stage must be at least about 2 atmospheres and preferably about 3 to about 20 atmospheres. All of the gas containing molecular oxygen need not be added to the reaction mixture being treated with nitric acid at the beginning of the reaction period but can be added thereto continuously or at intervals during the reaction, provided the partial pressure of the oxygen upon the reactants is maintained within the limits defined above at all times.

The reduction in the amount of nitric acid consumed by maintaining a partial pressure of molecular oxygen upon the reactants in accordance with the process of this invention is illustrated in the following two examples.

EXAMPLE I

A mixture comprising 175 grams of cyclohexanol and 175 grams of cyclohexanone was pumped into a stirred autoclave containing 1750 grams of 60 percent nitric acid over a period of 2 hours during which time the temperature was maintained at 60° C. The resulting mixture was then heated to a temperature of 110° C. over a period of one-half hour and was held at the latter temperature for one additional hour. The pressure, originally at atmospheric, gradually rose over the heating period to a pressure of 415 pounds per square inch gauge. At the completion of the run, the autoclave was cooled, the gases therein were bled off, measured, and submitted for analysis, and the liquid and solid products remaining were treated for the recovery of adipic acid and nitric acid.

EXAMPLE II

In this run, the amounts of cyclohexanol and cyclohexanone, the amount and concentration of the nitric acid, and the time and temperature conditions were identical to that employed in Example I. The only difference between this run and the run reported in Example I was that in this run 174 grams of oxygen were added to the reactants, 16 percent at the beginning and the remainder intermittently throughout the run. The total pressure in the autoclave varied from a low of 80 pounds per square inch gauge at the start of the operation to a high of 600 pounds per square inch gauge at the conclusion of the run, with the average total pressure being about 250 pounds per square inch gauge. The partial pressure of the oxygen during the course of the run varied from a low of about 5½ atmospheres to a maximum of about 18 atmospheres at the end of the run.

The results obtained from these two runs are outlined below in Table I.

Table I

|  | Example I | Example II |
|---|---|---|
|  | Gms. | Gms. |
| Yield of Recrystallized Adipic Acid | 393.7 | 381.7 |
| Oxygen Consumed |  | 64 |
| $HNO_3$ Consumed (Calculated from Gas Analysis) | 478 | 332 |
| $HNO_3$ Consumption on Basis of Gas Analysis, g./g. of Adipic Acid Recovered | 1.227 | 0.869 |

The gas analysis showed $N_2$, $N_2O$ and $NO$ to be present at the end of the runs as follows:

Table II

|  | Example I | Example II |
|---|---|---|
|  | Gms. | Gms. |
| $N_2$ | 26.2 | 12.2 |
| $N_2O$ | 119.3 | 96.8 |
| $NO$ | 8.6 | None |

In order to determine the nitric acid equivalent of the $N_2$, $N_2O$ and $NO$ present in the gases produced during the runs, the following equations were employed:

(1) $2HNO_3 \rightarrow N_2 + 2\frac{1}{2}O_2 + H_2O$ (for $N_2$)

(2) $2HNO_3 \rightarrow N_2O + 2O_2 + H_2O$ (for $N_2O$)

and (3) $2HNO_3 \rightarrow 2NO + 1\frac{1}{2}O_2 + H_2O$ (for $NO$)

The results obtained are tabulated below in Table III.

Table III

|  | Example I | Example II |
|---|---|---|
| $N_2$ | 118 gms. of $HNO_3$ | 55 gms. of $HNO_3$. |
| $N_2O$ | 342 gms. of $HNO_3$ | 277 gms. of $HNO_3$. |
| $NO$ | 18 gms. of $HNO_3$ | None. |
| Total $HNO_3$ accounted for in gas. | 478 gms. | 332 gms. |

The results set forth in Table I illustrate the great reduction in the consumption of nitric acid obtained as a result of operation in accordance with the process of this invention. As can be seen, employing the same reaction conditions in each of the runs but maintaining a partial pressure of molecular oxygen upon the reactants in one and not in the other results in a decrease in consumption in nitric acid amounting to about 30 percent.

The effect of the addition of molecular oxygen upon the reactants and the maintenance of a partial pressure of oxygen upon the reactants during the reaction with nitric acid is more than a mere matter of regenerating nitrogen oxides to higher oxides of nitrogen to serve as oxidants. The nitrogen and N₂O produced during the nitric acid reaction cannot be regenerated under the conditions maintained in the nitric acid reactor to higher oxides of nitrogen, and therefore the oxygen introduced has no effect on them. It will be seen from Table II that substantially less non-regenerable $N_2$ and $N_2O$ are formed in the run wherein oxygen is employed. NO formed during the reaction can be regenerated with oxygen. In the first run, 8.6 grams of regenerable NO are formed, while in the second, no NO is present. If it is assumed in the second case that NO is formed in the same amount as in the first case and all of it is converted to nitric acid in accordance with Equation 3 above, the amount of oxygen which would be required is but 6.9 grams. However, as can be seen from Table I, the amount consumed is 64 grams, which is far in excess thereof and cannot be explained as a simple regeneration procedure.

Obviously, many modifications and variations of the invention, as hereinabove set forth, may be made without departing from the spirit and scope thereof, and therefore only such limitations should be imposed as are indicated in the appended claims.

We claim:

1. A process for obtaining dibasic carboxylic acids from a mixture comprising cycloalkanols and cycloalkanones having about 4 to about 9 carbon atoms which comprises oxidizing said mixture with nitric acid having a concentration above about 40 percent at an elevated pressure and an elevated temperature while maintaining upon the reactants a partial pressure of molecular oxygen of at least about two atmospheres.

2. A process for obtaining dibasic carboxylic acids from a mixture comprising cycloalkanols and cycloalkanones having about 4 to about 9 carbon atoms which comprises oxidizing said mixture with nitric acid having a concentration above about 50 percent at an elevated pressure and an elevated temperature while maintaining upon the reactants a partial pressure of molecular oxygen of at least about two atmospheres.

3. A process for obtaining dibasic carboxylic acids from a mixture comprising cycloalkanols and cycloalkanones having about 4 to about 9 carbon atoms which comprises oxidizing said mixture with nitric acid having a concentration above about 40 percent at a pressure of about 50 to about 2000 pounds per square inch gauge and a temperature of about 30° to about 150° C., while maintaining upon the reactants a partial pressure of molecular oxygen of at least about two atmospheres.

4. A process for obtaining dibasic carboxylic acids from a mixture comprising cycloalkanols and cycloalkanones having about 4 to about 9 carbon atoms which comprises oxidizing said mixture with nitric acid having a concentration above about 50 percent at a pressure of about 50 to about 2000 pounds per square inch gauge and a temperature of about 30° to about 150° C., while maintaining upon the reactants a partial pressure of molecular oxygen of at least about two atmospheres.

5. A process for obtaining dibasic carboxylic acids from a mixture comprising cycloalkanols and cycloalkanones having about 4 to about 9 carbon atoms which comprises oxidizing said mixture with nitric acid having a concentration above about 50 percent at a pressure of about 50 to about 500 pounds per square inch gauge and a temperature of about 60° to about 120° C., while maintaining upon the reactants a partial pressure of oxygen of about two atmospheres.

6. A process for obtaining dibasic carboxylic acids from a mixture comprising cycloalkanols and cycloalkanones having about 4 to about 9 carbon atoms which comprises oxidizing said mixture with nitric acid having a concentration above about 40 percent in the presence of at least about 5 percent by weight of the charge of molecular oxygen at an elevated pressure and an elevated temperature while maintaining upon the reactants a partial pressure of molecular oxygen of at least about two atmospheres.

7. In a process wherein a charge comprising a cycloparaffin having about 4 to about 9 carbon atoms is oxidized in a first stage with air and at least a part of said oxidation product obtained is oxidized in a second stage at an elevated temperature with nitric acid having a concentration above about 40 percent to produce dibasic carboxylic acids, the improvement which comprises oxidizing in the second stage with nitric acid under pressure while maintaining upon the reactants a partial pressure of molecular oxygen of at least about two atmospheres.

8. In a process wherein a charge comprising a cycloparaffin having about 4 to about 9 carbon atoms is oxidized in a first stage with air and at least a part of said oxidation product obtained is oxidized in a second stage at an elevated temperature with nitric acid having a concentration above about 40 percent to produce dibasic carboxylic acids, the improvement which comprises oxidizing in the second stage with nitric acid under a pressure of about 50 to about 2000 pounds per square inch gauge while maintaining upon the reactants a partial pressure of molecular oxygen of at least about two atmospheres.

9. In a process wherein a charge comprising a cycloparaffin having about 4 to about 9 carbon atoms is oxidized in a first stage with air and at least a part of said oxidation product obtained is oxidized in a second stage at an elevated temperature with nitric acid to produce dibasic carboxylic acids, the improvement which comprises oxidizing in the second stage with nitric acid having a concentration above about 40 percent in the presence of at least about 5 percent by weight of the charge of molecular oxygen under a pressure of about 50 to about 500 pounds per square inch gauge while maintaining upon the reactants a partial pressure of molecular oxygen of at least about two atmospheres.

10. A process for obtaining dibasic carboxylic acids from a mixture comprising cyclohexanol, cyclohexanone, nitric acid having a concentration of about 60 percent, and oxygen, said reactants being present in a weight ratio of about 1:1:10:1, which comprises heating said reactants at a temperature varying from about 60° to about 110° C., at a pressure of about 250 pounds per square inch gauge for a time sufficient to form dibasic acids.

References Cited in the file of this patent

UNITED STATES PATENTS

| | | |
|---|---|---|
| 1,921,101 | Schrauth | Aug. 8, 1933 |
| 2,223,493 | Loder | Dec. 3, 1940 |
| 2,439,513 | Hamblet et al. | Apr. 13, 1948 |
| 2,452,741 | Fleming | Nov. 2, 1948 |
| 2,662,908 | Logan | Dec. 15, 1953 |
| 2,703,331 | Goldbeck et al. | Mar. 1, 1955 |

FOREIGN PATENTS

| | | |
|---|---|---|
| 461,064 | Canada | Nov. 15, 1949 |